US010726308B2

(12) United States Patent
Kumar et al.

(10) Patent No.: US 10,726,308 B2
(45) Date of Patent: Jul. 28, 2020

(54) IMAGE CONTENT MODERATION

(71) Applicant: ACCENTURE GLOBAL SOLUTIONS LIMITED, Dublin (IE)

(72) Inventors: Amioy Kumar, Bangalore (IN); Nagendra K. Kumar, Madanapalle (IN); Madhura Shivaram, Bangalore (IN); Suraj Govind Jadhav, Navi Mumbai (IN); Chung-Sheng Li, San Jose, CA (US); Saurabh Mahadik, Mumbai (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 205 days.

(21) Appl. No.: 15/715,305

(22) Filed: Sep. 26, 2017

(65) Prior Publication Data

US 2019/0012568 A1    Jan. 10, 2019

(30) Foreign Application Priority Data

Jul. 7, 2017    (IN) .............................. 201711024017

(51) Int. Cl.
*G06K 9/62*        (2006.01)
*G06F 17/30*       (2006.01)
(Continued)

(52) U.S. Cl.
CPC ............. *G06K 9/628* (2013.01); *G06F 16/51* (2019.01); *G06F 16/55* (2019.01);
(Continued)

(58) Field of Classification Search
CPC ...... G06F 16/51; G06F 16/55; G06F 16/5866; G06F 17/30268; G06F 17/3028;
(Continued)

(56) References Cited

U.S. PATENT DOCUMENTS 7,181,082 B2    2/2007  Feng
8,359,225 B1    1/2013  Seth
(Continued)

OTHER PUBLICATIONS

Sadek, Samy, et al. "A robust neural system for objectionable image recognition." 2009 Second International Conference on Machine Vision. IEEE, 2009. (Year: 2009).*

(Continued)

*Primary Examiner* — Nirav G Patel
(74) *Attorney, Agent, or Firm* — Mannava & Kang, P.C.

(57) ABSTRACT

In some examples, image content moderation may include classifying, based on a learning model, an object displayed in an image into a category. Further, image content moderation may include detecting, based on another learning model, the object, refining the detected object based on a label, and determining, based on the another learning model, a category for the refined detected object. Further, image content moderation may include identifying, based on the label, a keyword associated with the object, and determining, based on the identified keyword, a category for the object. Further, image content moderation may include categorizing, based on a set of rules, the object into a category, and moderating image content by categorizing, based on aforementioned analysis the object into a category. Yet further, image content moderation may include tagging, based on fusion-based tagging, the object with a category and a color associated with the object.

7 Claims, 19 Drawing Sheets

(51) Int. Cl.
*G06N 3/08* (2006.01)
*G06K 9/00* (2006.01)
*G06K 9/46* (2006.01)
*G06N 5/02* (2006.01)
*G06F 16/51* (2019.01)
*G06F 16/58* (2019.01)
*G06N 5/04* (2006.01)
*G06N 3/04* (2006.01)
*G06F 16/55* (2019.01)

(52) U.S. Cl.
CPC ...... *G06F 16/5866* (2019.01); *G06F 17/3028* (2013.01); *G06F 17/30268* (2013.01); *G06K 9/00228* (2013.01); *G06K 9/00973* (2013.01); *G06K 9/4652* (2013.01); *G06K 9/6256* (2013.01); *G06N 3/0454* (2013.01); *G06N 3/08* (2013.01); *G06N 5/02* (2013.01); *G06N 5/04* (2013.01)

(58) Field of Classification Search
CPC ........... G06K 9/00228; G06K 9/00973; G06K 9/4652; G06K 9/6256; G06K 9/628; G06N 3/0454; G06N 3/08; G06N 5/02; G06N 5/04
See application file for complete search history.

(56) References Cited

U.S. PATENT DOCUMENTS

| | | |
|---|---|---|
| 9,471,851 B1 | 10/2016 | Cao et al. |
| 2008/0152231 A1 | 6/2008 | Gokturk et al. |
| 2015/0286955 A1* | 10/2015 | Virkar ................ G06N 20/00 706/12 |
| 2017/0132497 A1 | 5/2017 | Santos et al. |
| 2017/0270582 A1* | 9/2017 | Forss ................ G06Q 30/0623 |

OTHER PUBLICATIONS

Zahavy et al., "Is a Picture Worth a Thousand Words? A Deep Multi-Modal Fusion Architecture for Product Classification in E-Commerce", Nov. 29, 2016, 10 pages.
Sun et al., "Chimera: Large-Scale Classification using Machine Learning, Rules, and Crowdsourcing", Proceedings of the CLDB Endowment, vol. 7, Sep. 1, 2014, pp. 1529-1540.

* cited by examiner

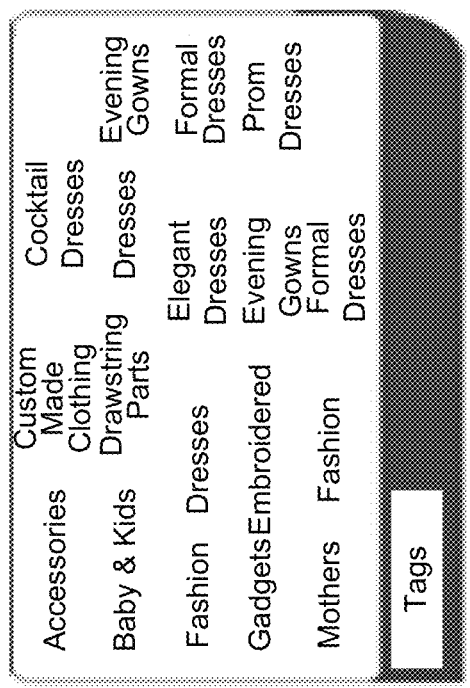
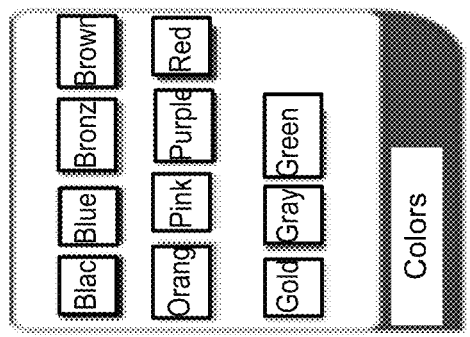
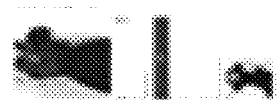
FIG. 4

Inappropriate Reason — 106

- Counterfeit of a major brand
- Pictured with boxes/bag/hanger of a major brand
- Blurred out tag or label
- Blurred watermark
- Blurred or censored face
- Celebrity photo
- Weapon
- Trademarked team logo
- Child Carseat
- Child Harness
- Piercing Gun
- Tattoo Gun
- E-cigarettes and Tobacco Products
- Lighters
- Dangerous Chemicals
- Recalled Toys
- Bike and Motorcycle Helmets
- Plant Seeds
- Virtual Goods
- Nudity
- Hate Crime
- Hoverboard

CLASSIFY, BY AN OBJECT TAGGING CLASSIFIER THAT IS EXECUTED BY AT LEAST ONE HARDWARE PROCESSOR, BASED ON A LEARNING MODEL, AN OBJECT DISPLAYED IN AN IMAGE INTO A CATEGORY OF A PLURALITY OF CATEGORIES
1602

DETERMINE, BY A COLOR TAGGER THAT IS EXECUTED BY THE AT LEAST ONE HARDWARE PROCESSOR, COLOR INFORMATION FROM THE OBJECT
1604

DETERMINE, BY A COLOR TAGGER THAT IS EXECUTED BY THE AT LEAST ONE HARDWARE PROCESSOR, A PLURALITY OF COLOR TAGS ASSOCIATED WITH THE OBJECT
1606

DETERMINE, BY A COLOR TAGGER THAT IS EXECUTED BY THE AT LEAST ONE HARDWARE PROCESSOR, A PLURALITY OF COLOR DISTANCES BETWEEN THE COLOR INFORMATION AND THE PLURALITY OF COLOR TAGS
1608

DETERMINE, BY A COLOR TAGGER THAT IS EXECUTED BY THE AT LEAST ONE HARDWARE PROCESSOR, A COLOR TAG OF THE PLURALITY OF COLOR TAGS THAT IS TO BE ASSIGNED TO THE OBJECT BASED ON A DETERMINATION OF A MINIMUM COLOR DISTANCE FROM THE PLURALITY OF COLOR DISTANCE
1610

DETERMINE, BY A KEYWORD TAGGING ANALYZER THAT IS EXECUTED BY THE AT LEAST ONE HARDWARE PROCESSOR, A CATEGORY AND A COLOR ASSOCIATED WITH THE OBJECT BASED ON A LABEL ASSOCIATED WITH THE OBJECT
1612

MODERATE, BY A FUSION-BASED TAGGER THAT IS EXECUTED BY THE AT LEAST ONE HARDWARE PROCESSOR, IMAGE CONTENT OF THE IMAGE BY TAGGING, BASED ON THE CLASSIFICATION OF THE OBJECT TAGGING CLASSIFIER, THE DETERMINATION OF THE COLOR TAGGER, AND THE DETERMINATION OF THE KEYWORD TAGGING ANALYZER, THE OBJECT DISPLAYED IN THE IMAGE WITH A CATEGORY AND A COLOR ASSOCIATED WITH THE OBJECT
1614

*FIG. 16 (CONT)*

IMAGE CONTENT MODERATION

PRIORITY

The present application claims priority under 35 U.S.C. 119(a)-(d) to Indian patent application number 201711024017, having a filing date of Jul. 7, 2017, the disclosure of which is hereby incorporated by reference in its entirety.

BACKGROUND

An image may include various objects that are to be categorized and/or tagged. For example, an image may include content that is inappropriate. An image may include, objects, such as clothing articles that are to be categorized as male, female, neutral, etc. An image may also include clothing articles that are to be tagged according to attributes such as size, color, etc.

BRIEF DESCRIPTION OF DRAWINGS

Features of the present disclosure are illustrated by way of example and not limited in the following figure(s), in which like numerals indicate like elements, in which:

FIG. 4 illustrates an example of detailed tagging to illustrate operation of the image content moderation apparatus of FIG. 1 in accordance with an example of the present disclosure;

FIG. 5 illustrates predetermined classes that represent inappropriate content for inappropriate content tagging to illustrate operation of the image content moderation apparatus of FIG. 1 in accordance with an example of the present disclosure;

FIG. 16 illustrates a flowchart of an example method for image content moderation in accordance with an example of the present disclosure.

DETAILED DESCRIPTION

Figure 1:
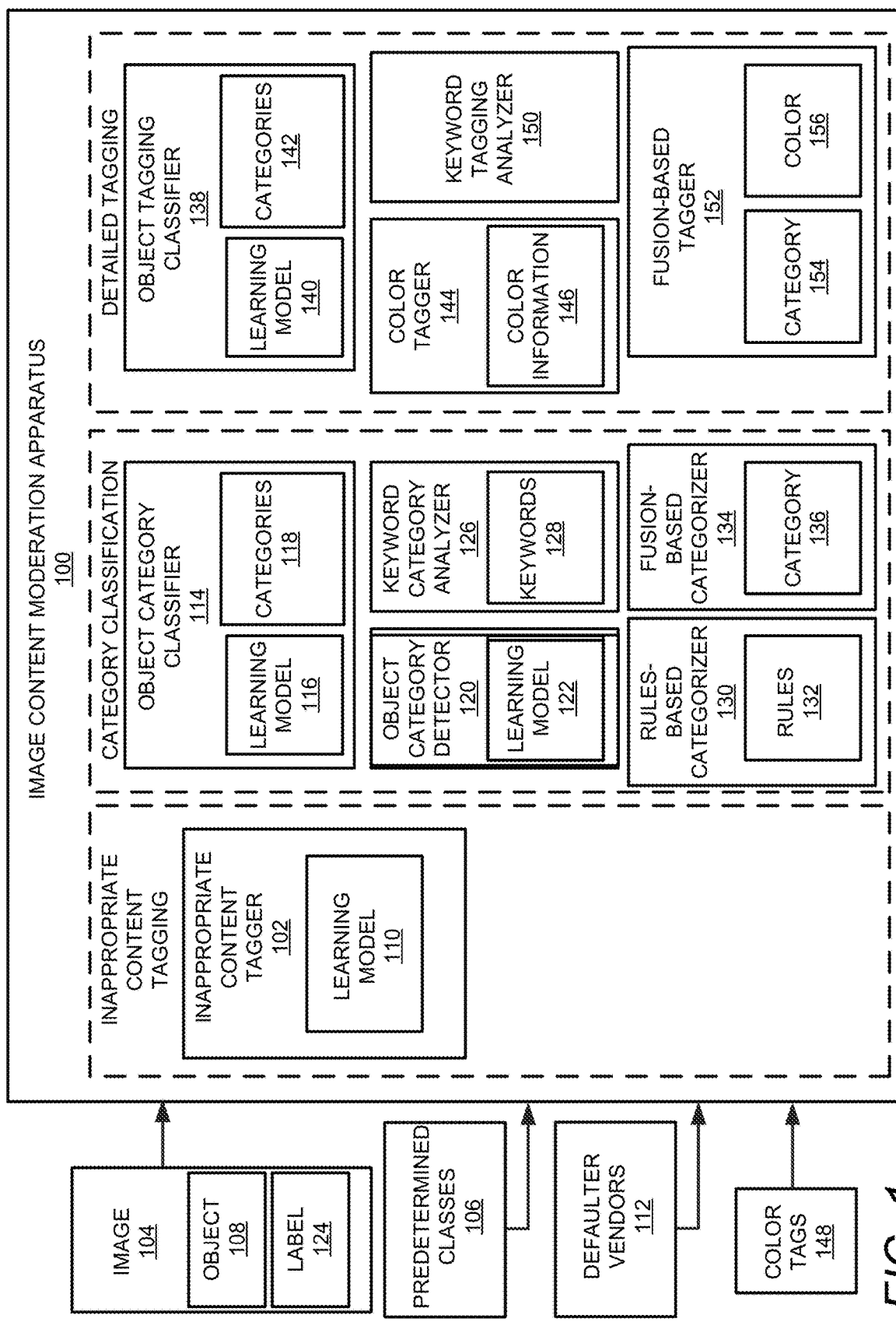
FIG. 1 illustrates a layout of an image content moderation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Image content moderation apparatuses, methods for image content moderation, and non-transitory computer readable media having stored thereon machine readable instructions to provide image content moderation are disclosed herein. The apparatuses, methods, and non-transitory computer readable media disclosed herein provide for inappropriate content tagging, category classification, and/or detailed tagging of an object in an image. Inappropriate content tagging may include identification of unauthorized content, and tagging of the unauthorized content as inappropriate. Category classification may include, for example, assignment of a gender to an object. For example, a gender such as male, female, or neutral may be assigned to an object such as a clothing product. With respect to detailed tagging, an object, such as a clothing article, may be tagged with respect to attributes such as size, color, fabric, etc.

Image content moderation may refer to the practice of evaluating images for illegal or unwanted content in order to make decisions about what is acceptable and what is not. In this regard, inappropriate products such as weapons, safety equipment, seeds, etc., may be disallowed in certain images. Similarly, product images that may be blurred, images of celebrities, counterfeited brand images, etc., may be disallowed. Image content moderation may also include categorization and detailed tagging of products.

With respect to categorization and detailed tagging of products, in an e-commerce application, products may be sold online through websites. In order to sell products through a website, a vendor may upload images of products that need to be moderated before being posted on the website. The content moderation of the products may be based on polices and rules specified by an e-commerce company that is to sell the products online.

It is technically challenging to determine whether content of an image is appropriate or inappropriate, in view of the various types of content that may be present in an image. It is technically challenging to classify products according to categories, for example, on e-commerce marketplace websites, with respect gender. For example, face recognition may be used to guess as to whether a product is to be categorized as male or female. However, products at e-commerce websites may be displayed by persons whose gender (e.g., male/female) may differ from the gender of the product (e.g., female/male). Further, it is technically challenging to tag products, for example, on e-commerce marketplace websites, with respect attributes of the products. For example, a product on an e-commerce website may need to be tagged with respect to color information, category of the product, fiber used in product, etc.

In order to address at least these technical challenges with respect to inappropriate content tagging, classification of objects according to categories, and detailed tagging of objects, such as products, on images, such as those included on e-commerce websites, the image content moderation as disclosed herein provides for inappropriate content tagging, classification of objects according to categories, and detailed tagging of objects.

With respect to inappropriate content tagging, the image content moderation as disclosed herein may include ascertaining (e.g., by an inappropriate content tagger) an image. The image content moderation as disclosed herein may further include determining, for the image, a plurality of predetermined classes that represent inappropriate content, and identifying an object displayed in the image. The image content moderation as disclosed herein may further include analyzing the object with respect to each class of the plurality of predetermined classes, and classifying, based on the analysis of the object with respect to each class of the plurality of predetermined classes, the object as appropriate or inappropriate. The image content moderation as disclosed herein may further include determining whether the object is classified as inappropriate, and in response to a determination that the object is classified as inappropriate, marking the object as inappropriate.

With respect to classification of objects according to categories, the image content moderation as disclosed herein may include classifying (e.g., by an object category classifier), based on a learning model, an object displayed in an image into a category of a plurality of categories. The image content moderation as disclosed herein may further include detecting (e.g., by an object category detector), based on another learning model, the object displayed in the image, refining (e.g., by the object category detector) the detected object based on a label associated with the detected object, and determining (e.g., by the object category detector), based on the another learning model, a category of the plurality of categories for the refined detected object. The image content moderation as disclosed herein may further include identifying (e.g., by a keyword category analyzer), based on the label, a keyword associated with the object displayed in the image from a plurality of keywords, and determining (e.g., by the keyword category analyzer), based on the identified keyword, of a category of the plurality of categories for the object displayed in the image. The image content moderation as disclosed herein may further include categorizing (e.g., by a rules-based categorizer), based on a set of rules, the object displayed in the image into a category of the plurality of categories. Further, the image content moderation as disclosed herein may include moderating of image content of the image by categorizing (e.g., by a fusion-based categorizer), based on the classification of the object category classifier, the determination of the object category detector, the determination of the keyword category analyzer, and the categorization of the rules-based categorizer, the object displayed in the image into a category of the plurality of categories.

With respect to detailed tagging of objects, the image content moderation as disclosed herein may include classifying (e.g., by an object tagging classifier), based on a learning model, an object displayed in an image into a category of a plurality of categories. The image content moderation as disclosed herein may further include determining (e.g., by a color tagger), color information from the object, a plurality of color tags associated with the object, a plurality of color distances between the color information and the plurality of color tags, and a color tag of the plurality of color tags that is to be assigned to the object based on a determination of a minimum color distance from the plurality of color distances. The color tag may represent a color that is to be assigned to the object. The image content moderation as disclosed herein may further include determining (e.g., by a keyword tagging analyzer), a category and a color associated with the object based on a label associated with the object. Further, the image content moderation as disclosed herein may include moderating (e.g., by a fusion-based tagger), image content of the image by tagging, based on the classification of the object tagging classifier, the determination of the color tagger, and the determination of the keyword tagging analyzer, the object displayed in the image with a category and a color associated with the object.

The apparatuses, methods, and non-transitory computer readable media disclosed herein provide for content moderation as a service. In this regard, the apparatuses, methods, and non-transitory computer readable media disclosed herein may be trained to understand a moderation queue and provide tagging of content based, for example, on machine learning and deep learning techniques for tagging the queues. The apparatuses, methods, and non-transitory computer readable media disclosed herein may also provide for tagging based, for example, on text fields, images, and videos with guidelines provided by the end user.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example image content moderation apparatus (hereinafter also referred to as "apparatus 100").

Referring to FIG. 1, with respect to inappropriate content tagging, the apparatus 100 may include an inappropriate content tagger 102, which is executed by at least one hardware processor (e.g., the processor 1502 of FIG. 15 or the processor 1704 of FIG. 17), to ascertain an image 104.

The inappropriate content tagger 102 is to determine, for the image 104, a plurality of predetermined classes 106 that represent inappropriate content.

The inappropriate content tagger 102 is to identify an object 108 displayed in the image 104.

The inappropriate content tagger 102 is to analyze the object 108 with respect to each class of the plurality of predetermined classes 106.

The inappropriate content tagger 102 is to classify, based on the analysis of the object 108 with respect to each class of the plurality of predetermined classes 106, the object 108 as appropriate or inappropriate.

The inappropriate content tagger 102 is to determine whether the object 108 is classified as inappropriate.

In response to a determination that the object 108 is classified as inappropriate, the inappropriate content tagger 102 is to mark the object 108 as inappropriate.

According to an example, the inappropriate content tagger 102 is to train a learning model 110 to analyze a region of the object 108, and analyze, based on the learning model 110, the object 108 with respect to each class of the plurality of predetermined classes 106.

According to an example, the inappropriate content tagger 102 is to detect a face of a person in the object 108, transform an image of the detected face into frequency domain, and determine an energy component of the transformed image of the detected face. Further, the inappropriate content tagger 102 is to compare the determined energy component to a threshold, and in response to a determination that the energy component is below the threshold, classify the object 108 as inappropriate.

According to an example, the inappropriate content tagger 102 is to ascertain a list of defaulter vendors 112, and compare a vendor associated with the inappropriate object with the list of defaulter vendors 112. In response to a determination that the vendor associated with the inappropriate object is on the list of defaulter vendors 112, the inappropriate content tagger 102 is to increase a defaulter probability associated with the vendor associated with the inappropriate object. Further, the inappropriate content tagger 102 is to compare a total probability based on the increase in the defaulter probability to a threshold, and in response to a determination that the total probability is greater than the threshold, the inappropriate content tagger 102 is to mark the vendor associated with the inappropriate object as being unauthorized to upload further images.

Referring to FIG. 1, with respect to category classification, the apparatus 100 may include an object category classifier 114, which is executed by at least one hardware processor (e.g., the processor 1502 of FIG. 15 or the processor 1704 of FIG. 17), to classify, based on a learning model 116, the object 108 displayed in the image 104 into a category of a plurality of categories 118. According to an example, the learning model 116 used by the object category classifier 114 may include a convolutional neural network based deep learning model. According to an example, the plurality of categories 118 may include male, female, and neutral. Further, according to an example, the object 108 may include a clothing product.

According to an example, the object category classifier 114 is to train the learning model 116 used by the object category classifier using a plurality of categorized images. Once the learning model 116 is trained, the object category classifier 114 is to classify, based on the trained learning model used by the object category classifier 114, the object 108 displayed in the image 104 into the category of the plurality of categories 118.

With respect to category classification, the apparatus 100 may include an object category detector 120, which is executed by the at least one hardware processor (e.g., the processor 1502 of FIG. 15 or the processor 1704 of FIG. 17) to detect, based on another learning model 122, the object 108 displayed in the image 104. Further, the object category detector 120 is to refine the detected object based on a label 124 associated with the detected object. Further, the object category detector 120 is to determine, based on the another learning model 122, a category of the plurality of categories 118 for the refined detected object. In this regard, the category of the plurality of categories 118 determined by the object category detector 120 may be the same category or a different category as determined by the object category classifier 114.

According to an example, the object category detector 120 is to refine the detected object based on the label 124 that includes a text label.

With respect to category classification, the apparatus 100 may include a keyword category analyzer 126, which is executed by the at least one hardware processor (e.g., the processor 1502 of FIG. 15 or the processor 1704 of FIG. 17) to identify, based on the label 124, a keyword associated with the object 108 displayed in the image 104 from a plurality of keywords 128. Further, the keyword category analyzer 126 is to determine, based on the identified keyword, a category of the plurality of categories 118 for the object 108 displayed in the image 104. In this regard, the category of the plurality of categories 118 determined by the keyword category analyzer 126 may be the same category or a different category as determined by the object category classifier 114 and/or the object category detector 120.

With respect to category classification, the apparatus 100 may include a rules-based categorizer 130, which is executed by the at least one hardware processor (e.g., the processor 1502 of FIG. 15 or the processor 1704 of FIG. 17) to categorize, based on a set of rules 132, the object 108 displayed in the image 104 into a category of the plurality of categories 118. In this regard, the category of the plurality of categories 118 determined by the rules-based categorizer 130 may be the same category or a different category as determined by the object category classifier 114, the object category detector 120, and/or the keyword category analyzer 126.

With respect to category classification, the apparatus 100 may include a fusion-based categorizer 134, which is executed by the at least one hardware processor (e.g., the processor 1502 of FIG. 15 or the processor 1704 of FIG. 17) to moderate image content of the image 104 by categorizing, based on the classification of the object category classifier 114, the determination of the object category detector 120, the determination of the keyword category analyzer 126, and the categorization of the rules-based categorizer 130, the object 108 displayed in the image 104 into a category 136 of the plurality of categories 118. In this regard, the category 136 determined by the fusion-based categorizer 134 may be one of the categories determined by the object category classifier 114, the object category detector 120, the keyword category analyzer 126, and the rules-based categorizer 130.

According to an example, the fusion-based categorizer 134 is to moderate the image content of the image 104 by categorizing, based on a majority decision associated with the classification of the object category classifier 114, the determination of the object category detector 120, the determination of the keyword category analyzer 126, and the categorization of the rules-based categorizer 130, the object 108 displayed in the image 104 into the category 136 of the plurality of categories 118.

With respect to detailed tagging, the apparatus 100 may include an object tagging classifier 138, which is executed by at least one hardware processor (e.g., the processor 1502 of FIG. 15 or the processor 1704 of FIG. 17), to classify, based on a learning model 140, the object 108 displayed in the image 104 into a category of a plurality of categories 142. In this regard, the categories 142 may be the same or different compared to the categories 118. For example, the categories 118 may include male, female, and neutral, and the categories 142 may include categories 1-10 that represent different sizes of clothes.

According to an example, the object tagging classifier 138 is to classify, based on the learning model 140, the object 108 displayed in the image 104 into the category of the plurality of categories 142, by training the learning model 140 using a plurality of categorized images, and classifying, based on the trained learning model, the object 108 into the category of the plurality of categories 142.

With respect to detailed tagging, the apparatus 100 may include a color tagger 144, which is executed by at least one hardware processor (e.g., the processor 1502 of FIG. 15 or the processor 1704 of FIG. 17), to determine color information 146 from the object 108, and a plurality of color tags 148 associated with the object 108. Further, the color tagger 144 is to determine a plurality of color distances between the color information 146 and the plurality of color tags 148. Yet further, the color tagger 144 is to determine a color tag of the plurality of color tags 148 that is to be assigned to the object 108 based on a determination of a minimum color distance from the plurality of color distances. In this regard, the color tag may represent a color that is to be assigned to the object 108.

With respect to detailed tagging, the apparatus 100 may include a keyword tagging analyzer 150, which is executed by at least one hardware processor (e.g., the processor 1502 of FIG. 15 or the processor 1704 of FIG. 17), to determine a category and a color associated with the object 108 based on the label 124 associated with the object 108. In this regard, the category and color determined by the keyword tagging analyzer 150 may be the same or different compared to the category determined by the object tagging classifier 138 and/or the color determined by the color tagger 144.

According to an example, the keyword tagging analyzer 150 is to refine the category classification by the object tagging classifier 138 and the color determination by the color tagger 144. In this regard, the category and color determination by the keyword tagging analyzer 150 may be used as a secondary or supplemental determination compared to the determination by the object tagging classifier 138 and the color tagger 144.

With respect to detailed tagging, the apparatus 100 may include a fusion-based tagger 152, which is executed by at least one hardware processor (e.g., the processor 1502 of FIG. 15 or the processor 1704 of FIG. 17), to moderate image content of the image 104 by tagging, based on the classification of the object tagging classifier 138, the determination of the color tagger 144, and the determination of the keyword tagging analyzer 150, the object 108 displayed in the image 104 with a category 154 and a color 156 associated with the object 108. In this regard, the category 154 and color 156 tagged by the fusion-based tagger 152 may be one of the categories determined by the object tagging classifier 138 and the keyword tagging analyzer 150, and one of the colors determined by the color tagger 144 and the keyword tagging analyzer 150.

According to an example, the fusion-based tagger 152 is to moderate, based on a majority decision associated with the classification of the object tagging classifier 138, the determination of the color tagger 144, and the determination of the keyword tagging analyzer 150, the object 108 displayed in the image 104 with the category and the color associated with the object 108.

Figure 2:
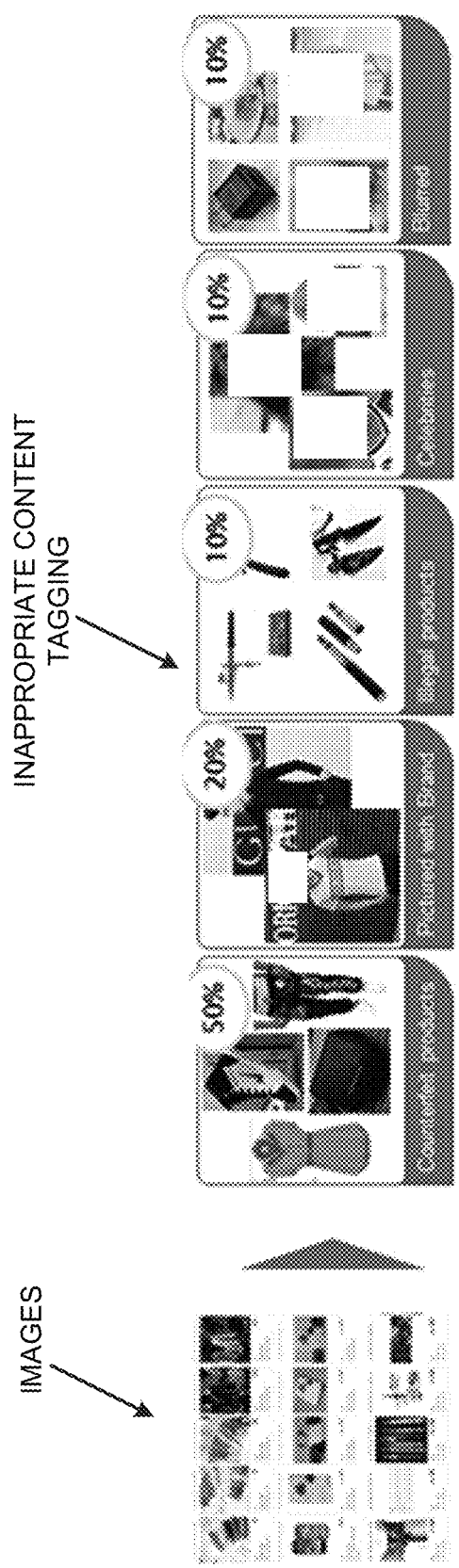
FIG. 2 illustrates an example of inappropriate content tagging to illustrate operation of the image content moderation apparatus of FIG. 1 in accordance with an example of the present disclosure.

FIG. 2 illustrates an example of inappropriate content tagging to illustrate operation of the apparatus 100 in accordance with an example of the present disclosure.

Referring to FIG. 2, with respect to inappropriate content tagging, e-commerce marketplace websites may need to disallow (referred as in-appropriate) certain types of products (e.g., weapons, safety equipment, seeds, etc.), as well as certain types of product images (e.g., blurred images, celebrity images, counterfeited brand images, etc.) to be sold from there website. In this regard, the apparatus 100 may detect these inappropriate products uploaded by vendors.

Figure 3:
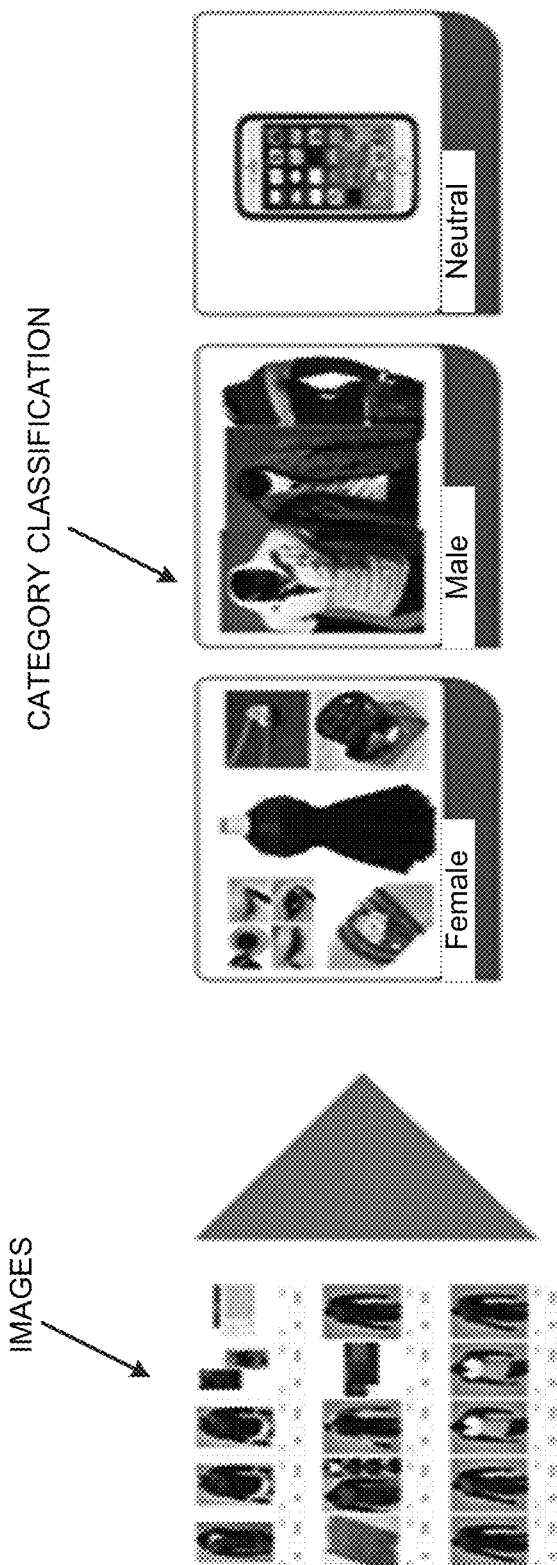
FIG. 3 illustrates an example of category (e.g., gender) classification to illustrate operation of the image content moderation apparatus of FIG. 1 in accordance with an example of the present disclosure.

FIG. 3 illustrates an example of category (e.g., gender) classification to illustrate operation of the apparatus 100 in accordance with an example of the present disclosure.

Referring to FIG. 3, the apparatuses, methods, and non-transitory computer readable media disclosed herein provide for category classification, for example, for e-commerce marketplace websites which may need the products to be classified into three genders: male, female, and neutral. In this regard, the apparatuses, methods, and non-transitory computer readable media disclosed herein provide for category classification of uploaded images of products, for example, into three genders: male, female, or neutral.

FIG. 4 illustrates an example of detailed tagging to illustrate operation of the apparatus 100 in accordance with an example of the present disclosure.

Referring to FIG. 4, the apparatuses, methods, and non-transitory computer readable media disclosed herein provide for detailed tagging, for example, for e-commerce marketplace websites of the detailed information of products, such as, color information, category of the product, fiber used in product, etc. In this regard, the apparatuses, methods, and non-transitory computer readable media disclosed herein provide for detailed tagging of detailed information of a product based on image and other specifications available with the uploaded products.

FIG. 5 illustrates predetermined classes that represent inappropriate content for inappropriate content tagging to illustrate operation of the apparatus 100 in accordance with an example of the present disclosure.

Referring to FIG. 5, for the predetermined classes 106, each uploaded image corresponding to a product may undergo content moderation. A product is to be tagged as inappropriate if even one uploaded image could be classified as inappropriate. Examples of reasons to tag a product as inappropriate are shown in FIG. 5 and include "counterfeit of a major brand", "blurred out tag or label", etc.

Figure 6:
FIG. 6 illustrates region-based analysis for inappropriate content tagging to illustrate operation of the image content moderation apparatus of FIG. 1 in accordance with an example of the present disclosure.

FIG. 6 illustrates region-based analysis for inappropriate content tagging to illustrate operation of the apparatus 100 in accordance with an example of the present disclosure.

Referring to FIG. 6, as disclosed herein, the inappropriate content tagger 102 is to train a learning model 110 to analyze a region of the object 108, and analyze, based on the learning model 110, the object 108 with respect to each class of the plurality of predetermined classes 106. In this regard, the inappropriate content tagger 102 may include a classifier corresponding to each reason (for inappropriate content) and allow each image of a product to pass through each of the classes. An image may be classified into one or more inappropriate classes. The image may be tagged with the classified one or more inappropriate reasons. Further, a region based convolutional neural network may be trained for classifying an image (or an object of the image) into an inappropriate category. The trained learning model 110 may track the inappropriate reason present in the image even at very partial amounts. For example, as shown in FIG. 6, a logo of a brand that is inappropriate is detected in the image even if the logo is present in a relatively small amount.

Figure 7:
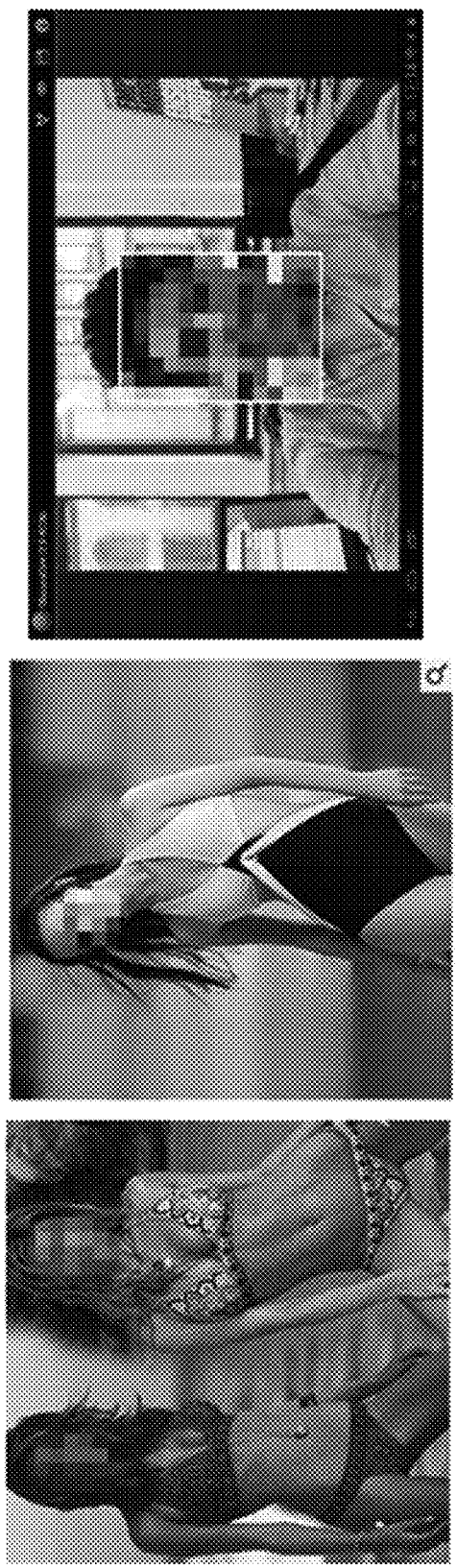
FIG. 7 illustrates blur detection for inappropriate content tagging to illustrate operation of the image content moderation apparatus of FIG. 1 in accordance with an example of the present disclosure.

FIG. 7 illustrates blur detection for inappropriate content tagging to illustrate operation of the apparatus 100 in accordance with an example of the present disclosure.

Referring to FIG. 7, as disclosed herein, the inappropriate content tagger 102 is to detect a face of a person in the object 108, transform an image of the detected face into frequency domain, and determine an energy component of the transformed image of the detected face. Further, the inappropriate content tagger 102 is to compare the determined energy component to a threshold, and in response to a determination that the energy component is below the threshold, classify the object 108 as inappropriate. In this regard, once the person's face is detected in the image, an image transformation technique may be used to transform the face image into the frequency domain. For example, Laplace and Fourier transformation may be used to transform the face image into the frequency domain. The energy component of the face image may then be determined and compared with an empirically chosen threshold to depict the presence of blur at the face image.

With respect to the defaulter vendors 112, as disclosed herein, the inappropriate content tagger 102 is to ascertain a list of defaulter vendors 112, and compare a vendor associated with the inappropriate object with the list of defaulter vendors 112. In response to a determination that the vendor associated with the inappropriate object is on the list of defaulter vendors 112, the inappropriate content tagger 102 is to increase a defaulter probability associated with the vendor associated with the inappropriate object. Further, the inappropriate content tagger 102 is to compare a total probability based on the increase in the defaulter probability to a threshold, and in response to a determination that the total probability is greater than the threshold, the inappropriate content tagger 102 is to mark the vendor associated with the inappropriate object as being unauthorized to upload further images. In this regard, once a product is classified as inappropriate, a checklist may be specified of the inappropriate product, and the corresponding vendor. The next time when the inappropriate product is received from the defaulter vendor, a defined probability may be added to the defaulter vendor. Hence, at a time if the probability of defaulter vendor increases with some threshold, the vendor may be discarded or otherwise unauthorized to upload products at an associated portal.

Figure 8:
FIG. 8 illustrates inappropriate content tagging to illustrate operation of the image content moderation apparatus of FIG. 1 in accordance with an example of the present disclosure.

FIG. 8 illustrates inappropriate content tagging to illustrate operation of the apparatus 100 in accordance with an example of the present disclosure.

Referring to FIG. 8, the apparatus 100 may be implemented, for example, as a CHROME™ extension to provide a seamless end to end 'inappropriate tagging' mechanism. The extension may extract the product-label (e.g., text information available with the product) and image-URLs corresponding to each product. In this case, more than one image may be associated with one product. Further, the extension may send the extracted text and image-URLs to a server for computation. The results (e.g., classes of inappropriate categories) for each product may then be tagged back to the web-page by selecting the available two inappropriate tags as shown in FIG. 8.

Figure 9:
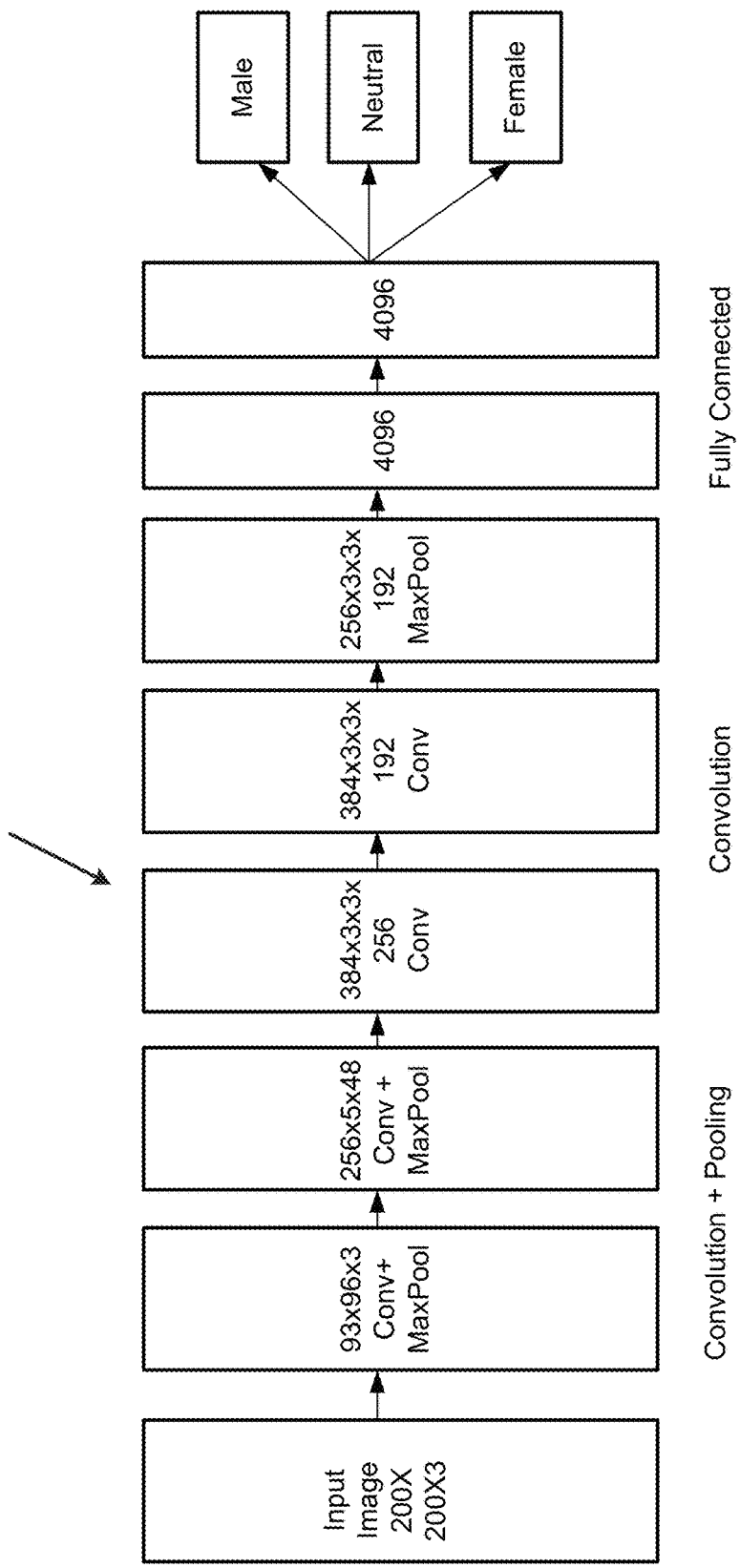
FIG. 9 illustrates an example of a convolutional neural network based learning model for category classification to illustrate operation of the image content moderation apparatus of FIG. 1 in accordance with an example of the present disclosure.

FIG. 9 illustrates an example of a convolutional neural network based learning model for category classification to illustrate operation of the apparatus 100 in accordance with an example of the present disclosure.

Referring to FIGS. 1 and 9, with respect to category classification, the object category classifier 114, which is executed by the at least one hardware processor (e.g., the processor 1502 of FIG. 15 or the processor 1704 of FIG. 17), is to classify, based on the learning model 116, the object 108 displayed in the image 104 into a category of the plurality of categories 118. In this regard, the learning model 116 may include a convolutional neural network based deep learning model, which may be trained for image classification. According to an example, the learning model 116 may include eight deep layers as shown in FIG. 9. The eight deep layers may include five convolutional layers, two fully connected layers, and one classification layer. The learning model 116 may be trained on images of a number of products (as per a list of products shared by an e-commerce provider) for gender classification.

As disclosed herein, the object category detector 120, which is executed by the at least one hardware processor (e.g., the processor 1502 of FIG. 15 or the processor 1704 of FIG. 17) is to detect, based on another learning model 122, the object 108 displayed in the image 104. Further, the object category detector 120 is to refine the detected object based on the label 124 associated with the detected object, and determine, based on the another learning model 122, a category of the plurality of categories 118 for the refined detected object. For example, the object category detector 120 may use a deep learning object detection model. The detected objects may then be refined using the label 124 available with the products. The learning model 122 may then provide the gender of the extracted product.

As disclosed herein, the keyword category analyzer 126, which is executed by the at least one hardware processor (e.g., the processor 1502 of FIG. 15 or the processor 1704 of FIG. 17) is to identify, based on the label 124, a keyword associated with the object 108 displayed in the image 104 from a plurality of keywords 128. Further, the keyword category analyzer 126 is to determine, based on the identified keyword, a category of the plurality of categories 118 for the object 108 displayed in the image 104. In this regard, the keyword category analyzer 126 may utilize product-labels (such as: "Women OL Business Blazer Suit Long Sleeve Casual Tops Slim Jacket Coat Outwear"), and process the labels to determine the gender of the product. A number of keywords associated with genders (male/female/neutral) may be formed, and whenever one of the keywords appears in the product-label, the keyword category analyzer 126 may use the identified keyword to provide the gender of the product. For example, the keywords at the aforementioned product-label may hint for the product as being for a female.

As disclosed herein, the rules-based categorizer 130, which is executed by the at least one hardware processor (e.g., the processor 1502 of FIG. 15 or the processor 1704 of FIG. 17) is to categorize, based on a set of rules 132, the object 108 displayed in the image 104 into a category of the plurality of categories 118. In this regard, the rules-based categorizer 130 may utilize the product-list and other rules provided, for example, by an e-commerce client, for gender classification. With respect to rules for gender classification of products, a rule may specify that children's products should always be classified as neutral. Based on the available rules, products may be divided into "hard" and "soft" categories. In the hard category, products may categorized as male/female/neutral based on a rule. For example, children's products should always be categorized into the neutral gender. For the soft category, a rule may not be available to categorize the product gender, and thus, the decision to categorize a product in a soft category may be based on the results, for example, of the object category classifier 114, the object category detector 120, and/or the keyword category analyzer 126.

Figure 10:
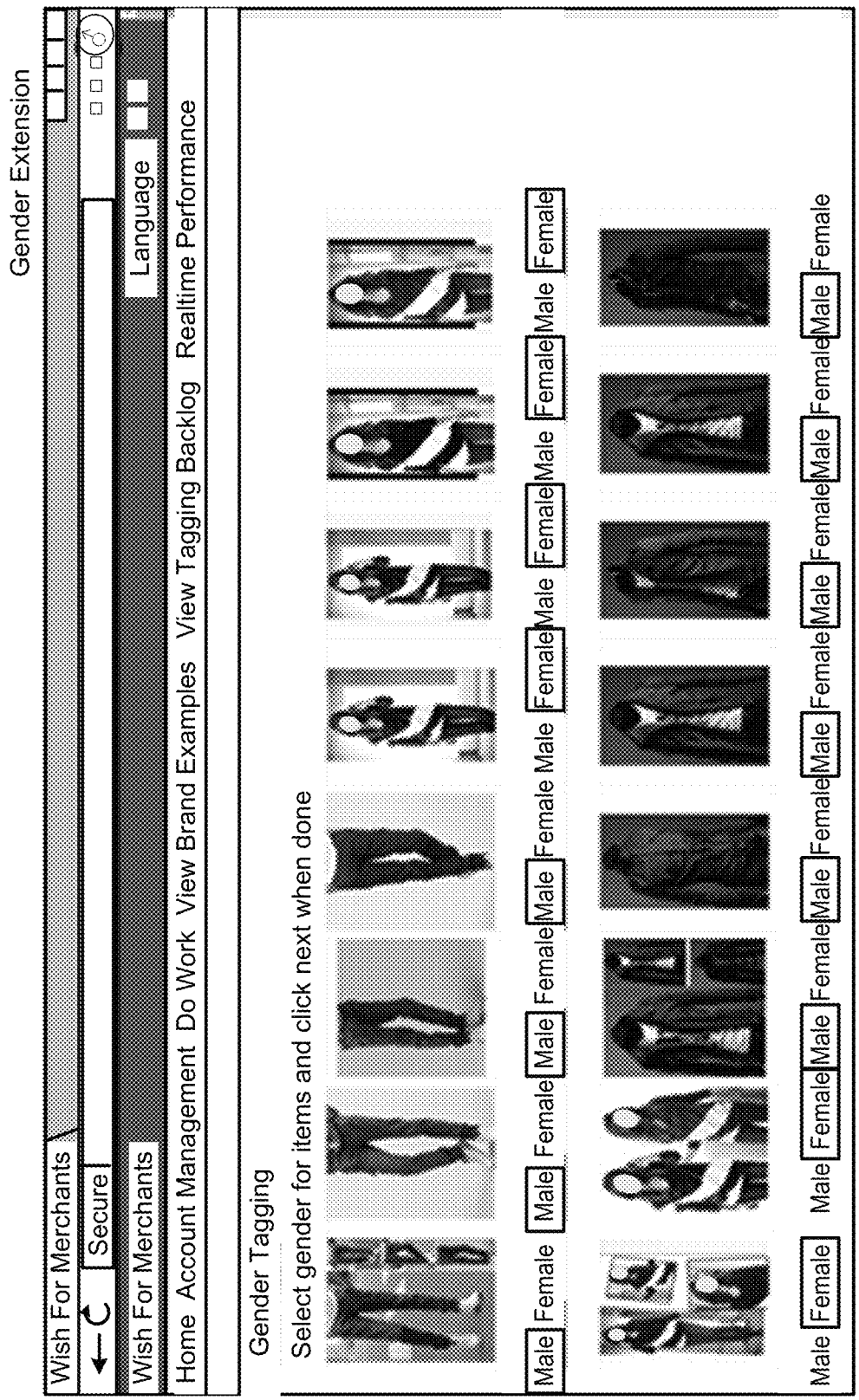
FIG. 10 illustrates an example of category (e.g., gender) classification to illustrate operation of the image content moderation apparatus of FIG. 1 in accordance with an example of the present disclosure.

FIG. 10 illustrates an example of category (e.g., gender) classification to illustrate operation of the apparatus 100 in accordance with an example of the present disclosure.

Referring to FIG. 10, as disclosed herein, the fusion-based categorizer 134, which is executed by the at least one hardware processor (e.g., the processor 1502 of FIG. 15 or the processor 1704 of FIG. 17) is to moderate image content of the image 104 by categorizing, based on the classification of the object category classifier 114, the determination of the object category detector 120, the determination of the keyword category analyzer 126, and the categorization of the rules-based categorizer 130, the object 108 displayed in the image 104 into a category 136 of the plurality of categories 118. In this regard, the fusion-based categorizer 134 is to generate a final categorization decision based on a combination of the classification of the object category classifier 114, the determination of the object category detector 120, the determination of the keyword category analyzer 126, and the categorization of the rules-based categorizer 130. For example, the fusion-based categorizer 134 may implement a majority voting scheme.

Referring again to FIG. 10, the apparatus 100 may be implemented, for example, as a CHROME™ extension to provide a seamless end to end 'gender classification' mechanism. The extension may extract the product-label (e.g., text information available with the product) and image-Uniform Resource Locators (URLs) corresponding to each product. In this case, more than one image may be associated with one product. Further, the extension may send the extracted text and image-URLs to a server for computation. The results (e.g., classes of images: male/female/neutral) for each product may then be tagged back to the web-page by selecting the available two tags: male or female as shown in FIG. 10, or male, female, or neutral if three tags are available.

Figure 11:
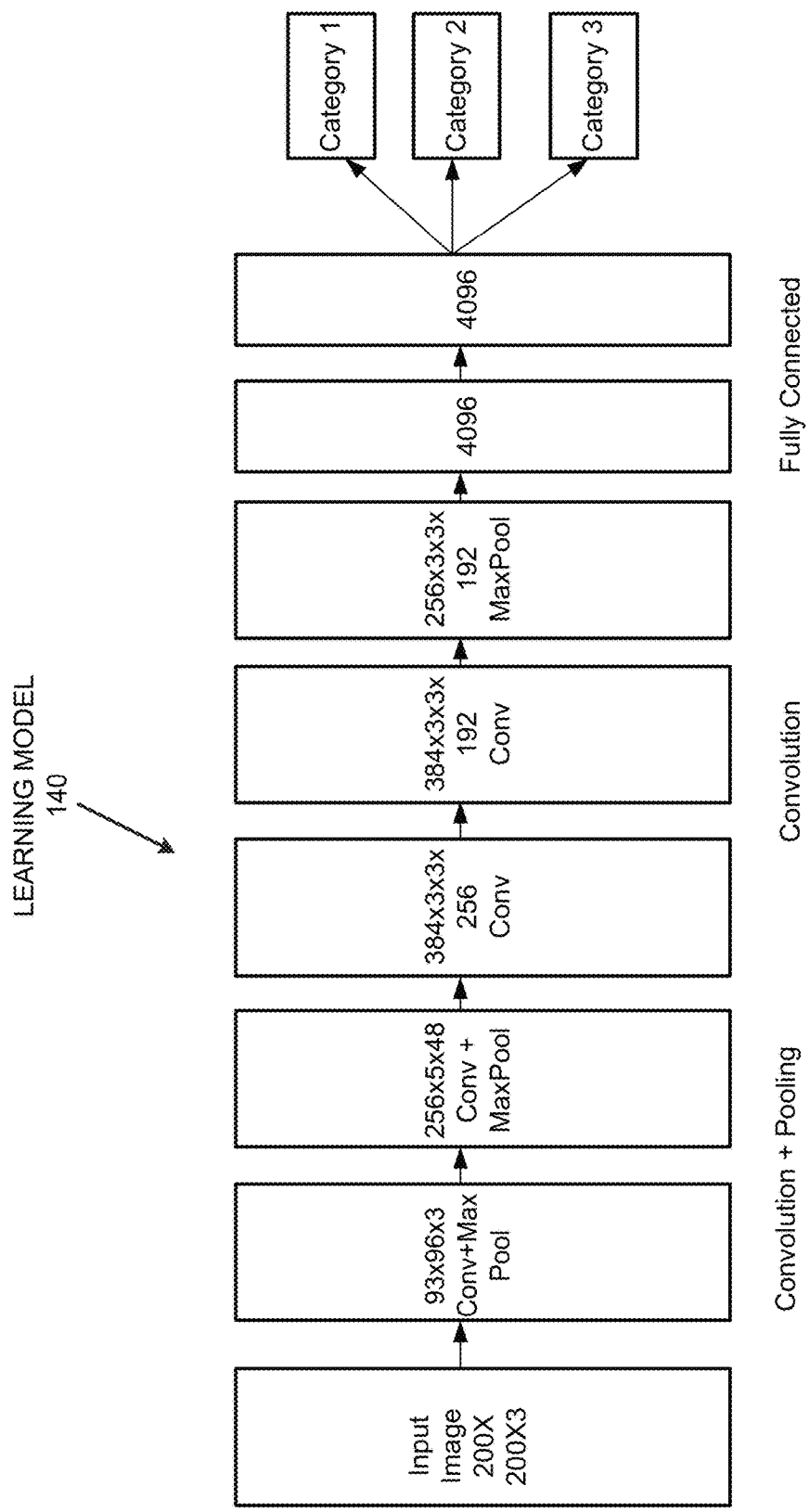
FIG. 11 illustrates an example of a convolutional neural network based learning model for detailed tagging to illustrate operation of the image content moderation apparatus of FIG. 1 in accordance with an example of the present disclosure.

FIG. 11 illustrates an example of a convolutional neural network based learning model for detailed tagging to illustrate operation of the apparatus 100 in accordance with an example of the present disclosure.

Referring to FIG. 11, as disclosed herein, the object tagging classifier 138, which is executed by at least one hardware processor (e.g., the processor 1502 of FIG. 15 or the processor 1704 of FIG. 17), is to classify, based on the learning model 140, the object 108 displayed in the image 104 into a category of the plurality of categories 142. In this regard, the learning model 140 may include a convolutional neural network based deep learning model that is trained on images of products, for example, from 1000 unique categories. The trained learning model 140 may classify the input images among one of the categories. As shown in FIG. 11, the learning model 140 may include eight deep layers, including five convolutional layers, two fully connected layers, and one classification layer.

Figure 12:
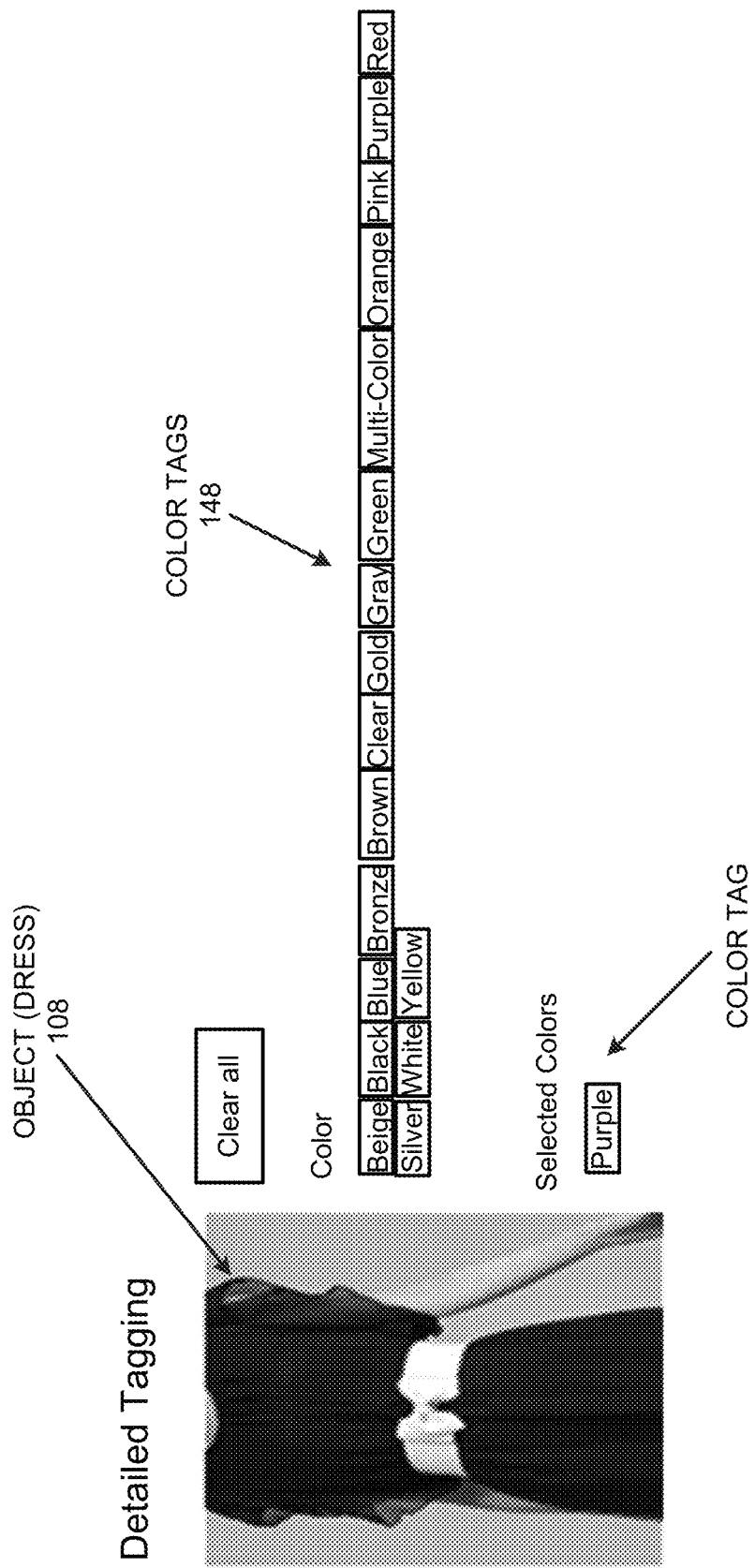
FIG. 12 illustrates an example of detailed tagging to illustrate operation of the image content moderation apparatus of FIG. 1 in accordance with an example of the present disclosure.

FIG. 12 illustrates an example of detailed tagging to illustrate operation of the apparatus 100 in accordance with an example of the present disclosure.

Referring to FIG. 12, as disclosed herein, the color tagger 144, which is executed by at least one hardware processor (e.g., the processor 1502 of FIG. 15 or the processor 1704 of FIG. 17), is to determine color information 146 from the object 108, and a plurality of color tags 148 associated with the object 108. Further, the color tagger 144 is to determine a plurality of color distances between the color information 146 and the plurality of color tags 148. Yet further, the color tagger 144 is to determine a color tag (e.g., "purple" for the example of FIG. 12) of the plurality of color tags 148 that is to be assigned to the object 108 based on a determination of a minimum color distance from the plurality of color distances. In this regard, the color tagger 144 may detect the object (or location) from the image in the presence of various other objects (or locations). The color tagger 144 may then detect the color from the object (or location). The color tagger 144 may utilize K-means clustering for detecting the color of a product. The detected color may be compared with the available color tags and the nearest color may be tagged for the object. As discussed below, the background color of the images may dominate the color extraction process, and hence in some cases may lead to an incorrect color extraction from the object. In this case, as discussed below, a histogram based technique may be implemented to remove background color from the extracted color of the object. The color tagger 144 may thus provide the color of the product present in the image.

In further detail, the color tagger 144 is to ascertain, for the image 104 that is to be analyzed, an attribute of the image 104. Further, the color tagger 144 is to determine, based on the attribute of the image 104, a target object (e.g., the object 108) that is to be identified and color tagged in the image 104. According to an example, the attribute of the image 104 may include audible and/or visible attributes associated with the image 104. According to an example, the target object may include an element and/or a region of the image 104.

The color tagger 144 is to extract, based on a learning model, a plurality of objects from the image 104. Further, the color tagger 144 is to identify, based on a comparison of the target object that is to be identified and color tagged in the image 104 and the plurality of extracted objects from the image, the target object in the image 104.

The color tagger 144 is to extract the color information 146 from the identified target object. The color tagger 144 is to ascertain a plurality of color tags 148 associated with the identified target object. Further, the color tagger 144 is to determine a plurality of color distances between the color information 146 and the plurality of color tags 148.

The color tagger 144 is to determine, based on a determination of a minimum color distance from the plurality of color distances, a color tag of the plurality of color tags 148 that is to be assigned to the identified target object.

The color tagger 144 is to determine whether background color (i.e., color of the image other than the color of objects in the image, or color of the image outside of the boundaries of the target object) should be removed from the image 104. In this regard, the analysis by the color tagger 144 may be performed prior to extraction of the color information from the identified target object. With respect to determining whether background color should be removed from the image 104, the color tagger 144 may determine a histogram of a plurality of color clusters, where the color clusters are determined from the entire image 104 (e.g., the extracted color information from the identified target object and color information from a remaining portion of the image 104). The plurality of color clusters may be determined, for example, by using k-means clustering. The color tagger 144 may sort histogram bins associated with the determined histogram of the plurality of color clusters in descending order. The color tagger 144 may determine a difference between a highest order bin and a subsequent bin of the sorted histogram bins. The difference may represent a difference between background color and a color of an object. The highest order bin may represent a bin which includes a highest count of color occurrences for a particular color in the image 104, the subsequent bin may represent a bin which includes the second highest count of color occurrences for the particular color in the image 104, and so forth. The color tagger 144 may determine whether the difference is greater than a specified threshold. For example, the specified threshold may be 40%. In this regard, in response to a determination that the difference is greater than the specified threshold, the color tagger 144 may remove background color from the image 104. Otherwise, in response to a determination that the difference is less than the specified threshold, the color tagger 144 may not remove background color from the image 104. In this manner, background color interference with respect to extraction of the color information 146 from the identified target object may be minimized.

According to an example, the attribute of the image 104 may include text associated with the image 104. In this regard, the color tagger 144 is to determine, based on the text associated with the image, the target object that is to be identified and color tagged in the image 104 by determining, based on an analysis of a repository of available objects based on the text associated with the image, types of related objects. According to an example, the types of related objects may include the target object that is to be identified and color tagged in the image 104. Further, the color tagger 144 is to identify, based on the comparison of the types of related objects and the plurality of extracted objects from the image, the target object in the image 104. According to an example, the types of related objects may be determined as a function of synonyms determined from the text associated with the image 104.

According to an example, the color tagger 144 is to extract color information from the identified target object by applying k-means clustering.

According to an example, the color tagger 144 is to determine the plurality of color distances between the color information 146 and the plurality of color tags 148 by determining values of L*C*h for each of the plurality of color tags. In this regard, L* may represent lightness, C* may represent chroma, and h may represent a hue angle. The color tagger 144 may also determine values of L*C*h for the extracted color information. Further, the color tagger 144 may determine, based on the L*C*h values for each of the plurality of color tags and the L*C*h values for the extracted color information, the plurality of color distances between the color information 146 and the plurality of color tags 148.

According to an example, the color tagger 144 is to determine the plurality of color distances between the color information and the plurality of color tags by determining CIEDE2000 color distances between the color information and the plurality of color tags.

Figure 13:
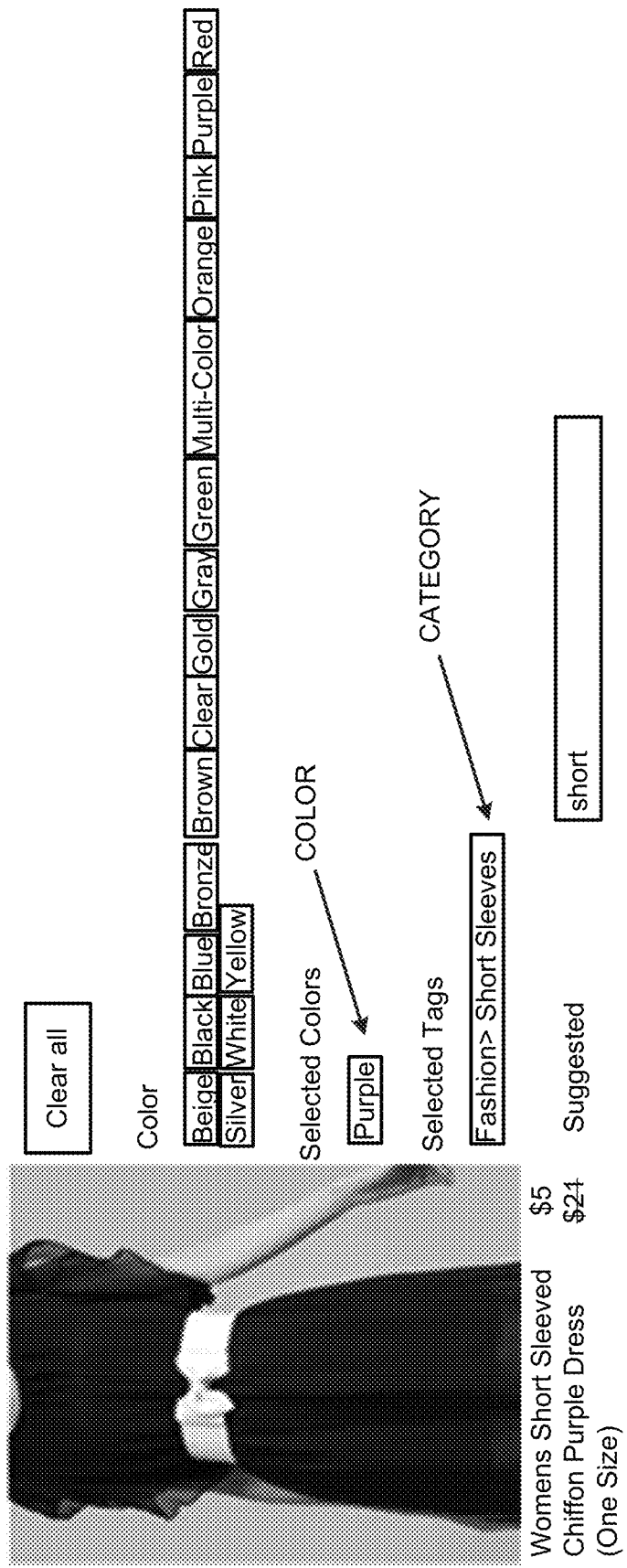
FIG. 13 illustrates an example of detailed tagging to illustrate operation of the image content moderation apparatus of FIG. 1 in accordance with an example of the present disclosure.

FIG. 13 illustrates an example of detailed tagging to illustrate operation of the apparatus 100 in accordance with an example of the present disclosure.

Referring to FIG. 13, as disclosed herein, the keyword tagging analyzer 150, which is executed by at least one hardware processor (e.g., the processor 1502 of FIG. 15 or the processor 1704 of FIG. 17), is to determine a category and a color associated with the object 108 based on the label 124 associated with the object 108. In this regard, a product may be uploaded by vendors with product information (e.g., text/label), which may represent the possible description of the product. For the example of FIG. 13, the product information may include "Womens Short Sleeved Chiffon", etc. The keyword tagging analyzer 150 may utilize a pre-trained model such as WORDNET™ and/or WORD2VEC™ to extract the most representative keywords from the available product description. Thus, the keyword tagging analyzer 150 may predict the category and color of the product in an image, and refine the tags provided by the object tagging classifier 138 and/or the color tagger 144 to determine the most representative tags for the category and color of the product. The results of the keyword tagging analyzer 150 may also be utilized in a weighted combination with respect to the object tagging classifier 138 and the color tagger 144. For example, the results of the object tagging classifier 138 may be assigned a weight W1, the results of the color tagger 144 may be assigned a weight W2, and the results of the keyword tagging analyzer 150 may be assigned a weight W3. In this manner, the category and/or color associated with the highest weight may be selected by the fusion-based tagger 152. For the example of FIG. 13, the color may be determined as purple, and the category may be determined as "short sleeves".

Figure 14:
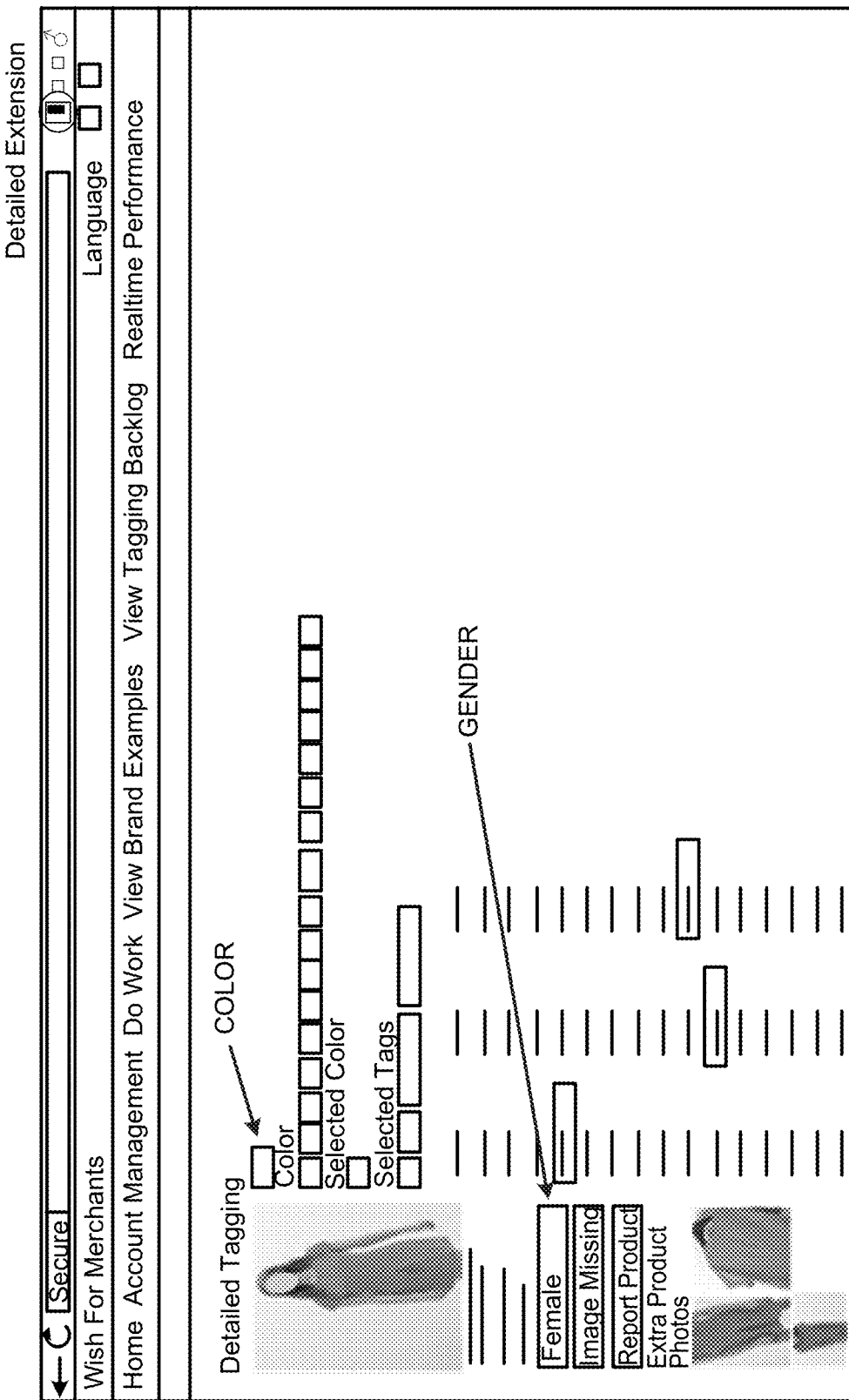
FIG. 14 illustrates an example of detailed tagging to illustrate operation of the image content moderation apparatus of FIG. 1 in accordance with an example of the present disclosure.

FIG. 14 illustrates an example of detailed tagging to illustrate operation of the apparatus 100 in accordance with an example of the present disclosure.

Referring to FIG. 14, the fusion-based tagger 152, which is executed by at least one hardware processor (e.g., the processor 1502 of FIG. 15 or the processor 1704 of FIG. 17), is to moderate image content of the image 104 by tagging, based on the classification of the object tagging classifier 138, the determination of the color tagger 144, and the determination of the keyword tagging analyzer 150, the object 108 displayed in the image 104 with a category 154 and a color 156 associated with the object 108.

Referring again to FIG. 14, the apparatus 100 may be implemented, for example, as a CHROME™ extension to provide a seamless end to end 'detailed tagging' mechanism. The extension may extract the product-label (e.g., text information available with the product) and image-URLs corresponding to each product. In this regard, more than one image may be associated with one product. The extension may further send the extracted text and image-URLs to a server for computation. Further, the results (product category and color) for each product may be tagged back to the web-page by selecting the available tags, as shown in FIG. 14. In this regard, FIG. 14 shows gender tagging (male/female/neutral), and color tagging.

Figure 15:
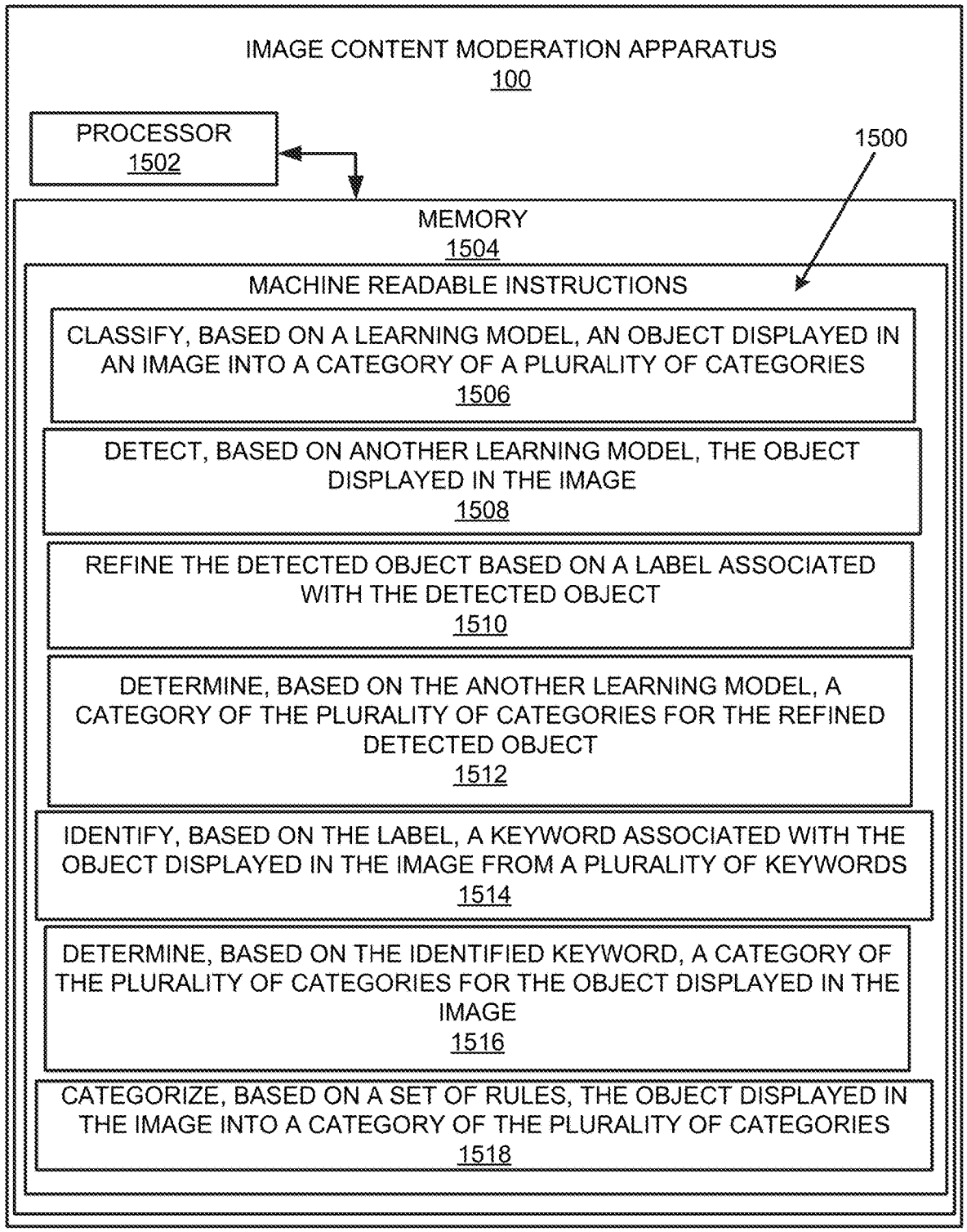
FIG. 15 illustrates an example block diagram for image content moderation in accordance with an example of the present disclosure.
Figure 15:
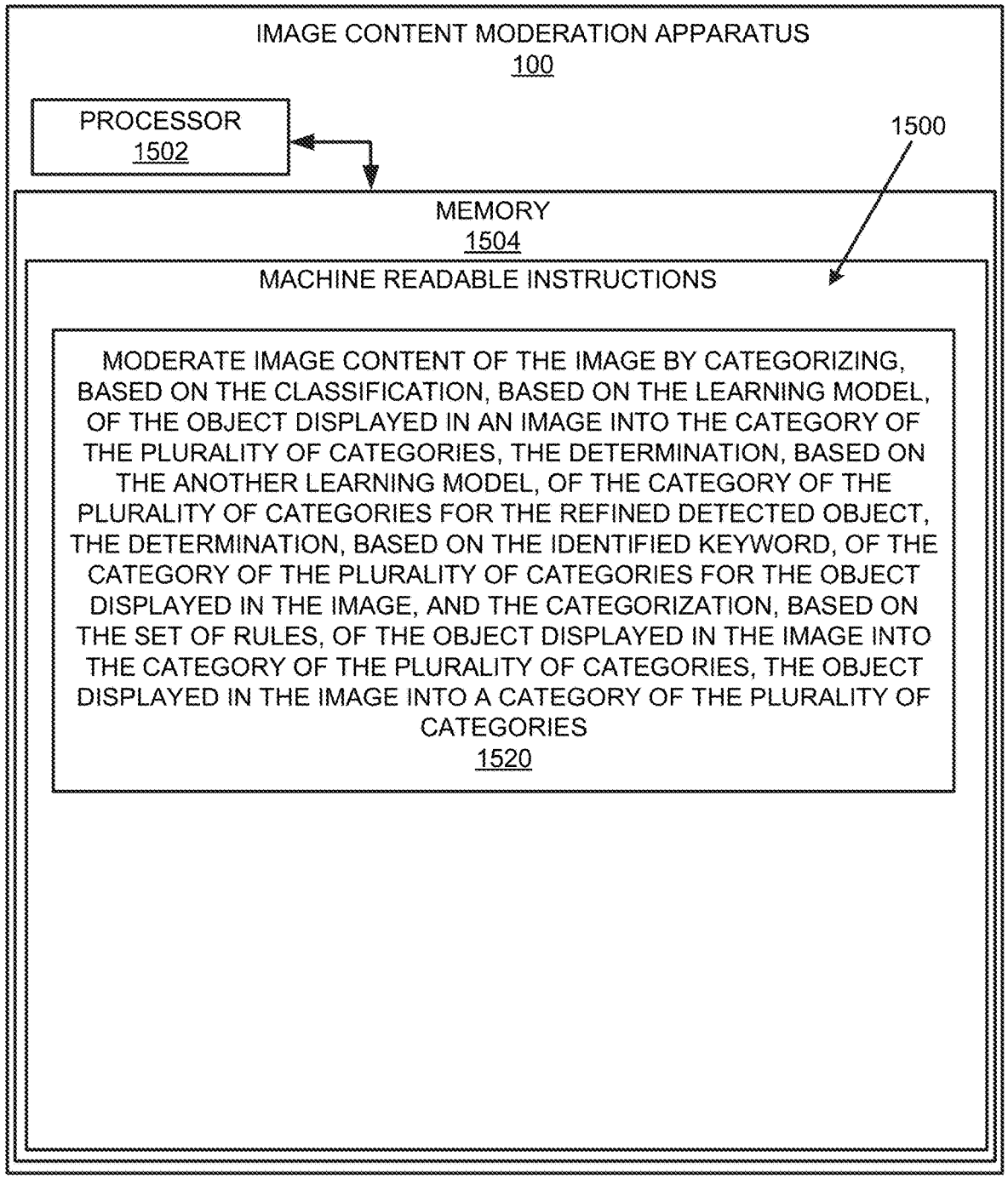
Figure 17:
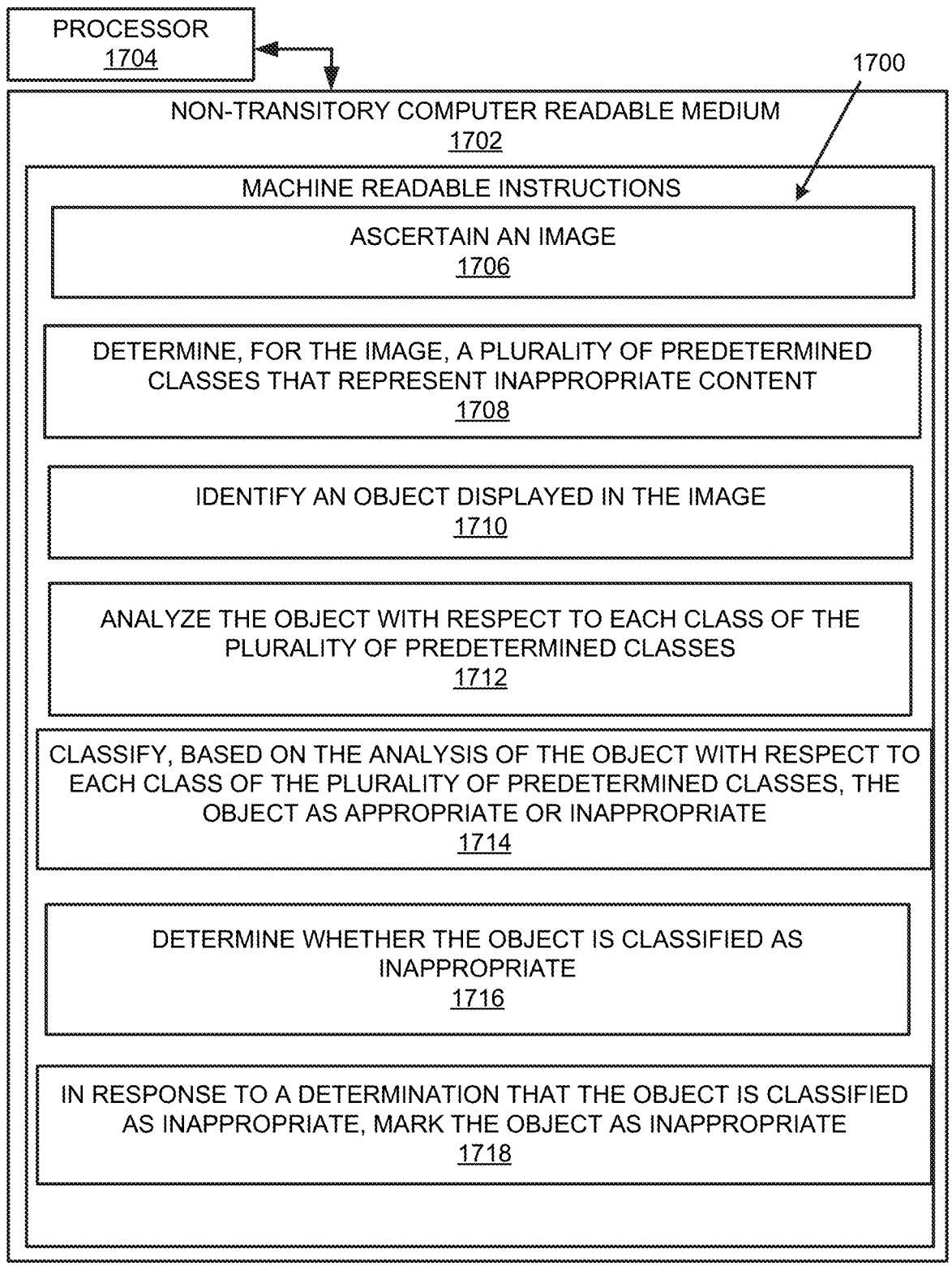
FIG. 17 illustrates a further example block diagram for image content moderation in accordance with another example of the present disclosure.

FIGS. 15-17 respectively illustrate an example block diagram 1500, a flowchart of an example method 1600, and a further example block diagram 1700 for image content moderation, according to examples. The block diagram 1500, the method 1600, and the block diagram 1700 may be implemented on the apparatus 100 described above with reference to FIG. 1 by way of example and not of limitation. The block diagram 1500, the method 1600, and the block diagram 1700 may be practiced in other apparatus. In addition to showing the block diagram 1500, FIG. 15 shows hardware of the apparatus 100 that may execute the instructions of the block diagram 1500. The hardware may include a processor 1502, and a memory 1504 storing machine readable instructions that when executed by the processor cause the processor to perform the instructions of the block diagram 1500. The memory 1504 may represent a non-transitory computer readable medium. FIG. 16 may represent an example method for image content moderation, and the steps of the method. FIG. 17 may represent a non-transitory computer readable medium 1702 having stored thereon machine readable instructions to provide image content moderation according to an example. The machine readable instructions, when executed, cause a processor 1704 to perform the instructions of the block diagram 1700 also shown in FIG. 17.

The processor 1502 of FIG. 15 and/or the processor 1704 of FIG. 17 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1702 of FIG. 17), such as hardware storage devices (e.g., RAM (random access memory), ROM (read only memory), EPROM (erasable, programmable ROM), EEPROM (electrically erasable, programmable ROM), hard drives, and flash memory). The memory 1504 may include a RAM, where the machine readable instructions and data for a processor may reside during runtime.

Referring to FIGS. 1-15, and particularly to the block diagram 1500 shown in FIG. 15, the memory 1504 may include instructions 1506 to classify (e.g., by the object category classifier 114 that is executed by the at least one hardware processor), based on a learning model, an object displayed in an image into a category of a plurality of categories.

The processor 1502 may fetch, decode, and execute the instructions 1508 to detect (e.g., by the object category detector 120 that is executed by the at least one hardware processor), based on another learning model, the object displayed in the image.

The processor 1502 may fetch, decode, and execute the instructions 1510 to refine (e.g., by the object category detector 120 that is executed by the at least one hardware processor) the detected object based on a label associated with the detected object.

The processor 1502 may fetch, decode, and execute the instructions 1512 to determine (e.g., by the object category detector 120 that is executed by the at least one hardware processor), based on the another learning model, a category of the plurality of categories for the refined detected object.

The processor 1502 may fetch, decode, and execute the instructions 1514 to identify (e.g., by the keyword category analyzer 126 that is executed by the at least one hardware processor), based on the label, a keyword associated with the object displayed in the image from a plurality of keywords.

The processor 1502 may fetch, decode, and execute the instructions 1516 to determine (e.g., by the keyword category analyzer 126 that is executed by the at least one hardware processor), based on the identified keyword, a category of the plurality of categories for the object displayed in the image.

The processor 1502 may fetch, decode, and execute the instructions 1518 to categorize (e.g., by the rules-based categorizer 130 that is executed by the at least one hardware processor), based on a set of rules, the object displayed in the image into a category of the plurality of categories.

The processor 1502 may fetch, decode, and execute the instructions 1520 to moderate (e.g., by the fusion-based categorizer 134 that is executed by the at least one hardware processor) image content of the image by categorizing, based on the classification of the object category classifier xxx, the determination of the object category detector xxx, the determination of the keyword category analyzer xxx, and the categorization of the rules-based categorizer xxx, the object displayed in the image into a category of the plurality of categories. In this regard, the processor 1502 may fetch, decode, and execute the instructions 1520 to moderate (e.g., by the fusion-based categorizer 134 that is executed by the at least one hardware processor) image content of the image by categorizing, based on the classification, based on the learning model, of the object displayed in an image into the category of the plurality of categories, the determination, based on the another learning model, of the category of the plurality of categories for the refined detected object, the determination, based on the identified keyword, of the category of the plurality of categories for the object displayed in the image, and the categorization, based on the set of rules, of the object displayed in the image into the category of the plurality of categories, the object displayed in the image into a category of the plurality of categories.

Referring to FIGS. 1-14 and 16, and particularly FIG. 16, for the method 1600, at block 1602, the method may include classifying, by the object tagging classifier 138 that is executed by at least one hardware processor, based on a learning model, an object displayed in an image into a category of a plurality of categories.

At block 1604, the method may include determining, by the color tagger 144 that is executed by the at least one hardware processor, color information from the object.

At block 1606, the method may include determining, by the color tagger 144 that is executed by the at least one hardware processor, a plurality of color tags associated with the object.

At block 1608, the method may include determining, by the color tagger 144 that is executed by the at least one hardware processor, a plurality of color distances between the color information and the plurality of color tags.

At block 1610, the method may include determining, by the color tagger 144 that is executed by the at least one hardware processor, a color tag of the plurality of color tags that is to be assigned to the object based on a determination of a minimum color distance from the plurality of color distances. The color tag may represent a color that is to be assigned to the object.

At block 1612, the method may include determining, by the keyword tagging analyzer 150 that is executed by the at least one hardware processor, a category and a color associated with the object based on a label associated with the object.

At block 1614, the method may include moderating, by the fusion-based tagger 152 that is executed by the at least one hardware processor, image content of the image by tagging, based on the classification of the object tagging classifier, the determination of the color tagger, and the determination of the keyword tagging analyzer, the object displayed in the image with a category and a color associated with the object.

Referring to FIGS. 1-14 and 17, and particularly FIG. 17, for the block diagram 1700, the non-transitory computer readable medium 1702 may include instructions 1706 to ascertain an image.

The processor 1704 may fetch, decode, and execute the instructions 1708 to determine, for the image, a plurality of predetermined classes that represent inappropriate content.

The processor 1704 may fetch, decode, and execute the instructions 1710 to identify an object displayed in the image.

The processor 1704 may fetch, decode, and execute the instructions 1712 to analyze the object with respect to each class of the plurality of predetermined classes.

The processor 1704 may fetch, decode, and execute the instructions 1714 to classify, based on the analysis of the object with respect to each class of the plurality of predetermined classes, the object as appropriate or inappropriate.

The processor 1704 may fetch, decode, and execute the instructions 1716 to determine whether the object is classified as inappropriate.

The processor 1704 may fetch, decode, and execute the instructions 1718 to, in response to a determination that the object is classified as inappropriate, mark the object as inappropriate.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An image content moderation apparatus comprising:
    an object category classifier, executed by at least one hardware processor, to
        classify, based on a learning model, an object displayed in an image into a category of a plurality of categories;
    an object category detector, executed by the at least one hardware processor, to
        detect, based on another learning model, the object displayed in the image,
        refine the detected object based on a displayed label associated with the detected object, and
        determine, based on the another learning model, a category of the plurality of categories for the refined detected object;
    a keyword category analyzer, executed by the at least one hardware processor, to
        identify, based on the label, a keyword associated with the object displayed in the image from a plurality of keywords, and
        determine, based on the identified keyword, a category of the plurality of categories for the object displayed in the image;
    a rules-based categorizer, executed by the at least one hardware processor, to
        categorize, based on a set of rules, the object displayed in the image into a category of the plurality of categories; and
    a fusion-based categorizer, executed by the at least one hardware processor, to
        moderate image content of the image by categorizing, based on the classification of the object category classifier, the determination of the object category detector, the determination of the keyword category analyzer, and the categorization of the rules-based categorizer, the object displayed in the image into a category of the plurality of categories.

2. The image content moderation apparatus according to claim 1, wherein the learning model used by the object category classifier includes a convolutional neural network based deep learning model.

3. The image content moderation apparatus according to claim 1, wherein the plurality of categories include male, female, and neutral.

4. The image content moderation apparatus according to claim 1, wherein the object includes a clothing product.

5. The image content moderation apparatus according to claim 1, wherein the object category classifier is executed by the at least one hardware processor to:
    train the learning model used by the object category classifier using a plurality of categorized images; and
    classify, based on the trained learning model used by the object category classifier, the object displayed in the image into the category of the plurality of categories.

6. The image content moderation apparatus according to claim 1, wherein the object category detector is executed by the at least one hardware processor to:
    refine the detected object based on the label that includes a text label.

7. The image content moderation apparatus according to claim 1, wherein the fusion-based categorizer is executed by the at least one hardware processor to:
    moderate the image content of the image by categorizing, based on a majority decision associated with the classification of the object category classifier, the determination of the object category detector, the determination of the keyword category analyzer, and the categorization of the rules-based categorizer, the object displayed in the image into the category of the plurality of categories.

* * * * *